Jan. 2, 1945.  C. W. KELSEY  2,366,626
MATERIAL WORKING APPARATUS
Filed May 27, 1943
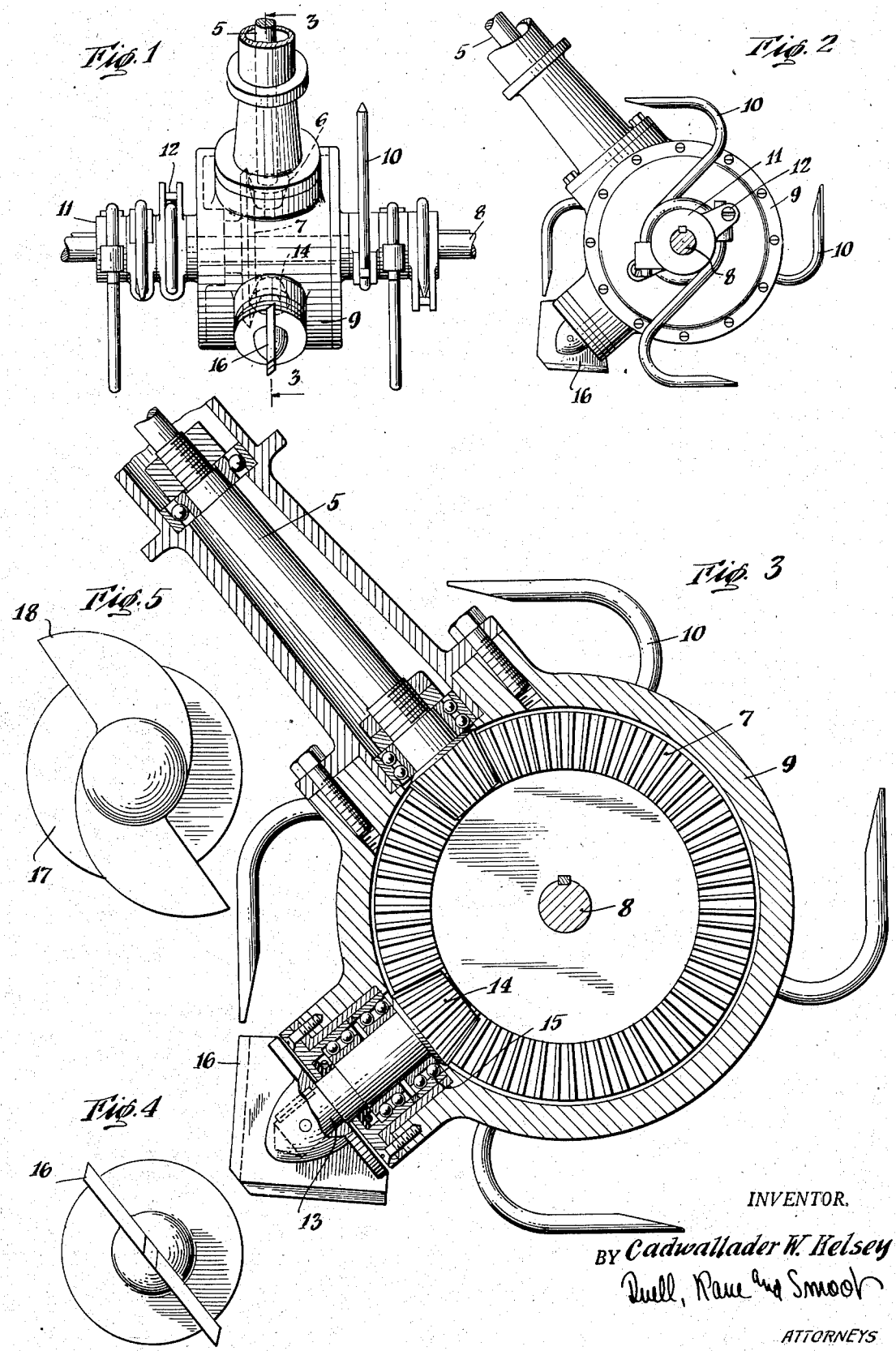
INVENTOR.
BY Cadwallader W. Kelsey
Duell, Kane and Smook
ATTORNEYS Patented Jan. 2, 1945

2,366,626

UNITED STATES PATENT OFFICE 2,366,626

MATERIAL-WORKING APPARATUS

Cadwallader W. Kelsey, Troy, N. Y., assignor to Rototiller, Inc., Troy, N. Y., a corporation of Delaware Application May 27, 1943, Serial No. 488,633

7 Claims. (Cl. 97—40)

This invention relates to a structurally and functionally improved material-working apparatus and in its more specific aspects aims to provide a machine primarily adapted for tilling the surface of the ground and portions below such surface to any proper depth.

In connection with tilling apparatus especially of the type commonly employed in agriculture, it is well appreciated that units have been placed on the market which are provided with a number of tilling tools or tines. In certain types of these apparatus, it has been customary to mount these tools upon a rotary shaft which is power driven. In order to furnish such a drive, a coupling has frequently extended to a point intermediate the ends of the tine-mounting shaft. Such a structure has functioned in a satisfactory manner excepting that in line with the drive the mounting of the tines or other tools has necessarily had to be interrupted. Therefore, the area of the ground traversed by the machine and in line with the drive coupling has not been satisfactorily worked.

By means of the present invention, this objection is overcome. Accordingly, the entire strip or swath of ground traversed by the machine will be properly treated or worked in a single traversal of the same and it will be unnecessary to again traverse the same path in order to assure that a uniform action has occurred throughout the entire area thereof.

A further object of the invention is that of providing a mechanism by means of which the foregoing result may be achieved and which mechanism will be of simple design, embodying relatively few and individually rugged parts, these parts being capable of ready assemblage to furnish a unitary apparatus operating over long periods of time with freedom from all difficulties.

With these and other objects in mind, reference is had to the attached sheet of drawings illustrating practical embodiments of the invention, and in which:

Fig. 1 is a fragmentary front view of a portion of the machine;

Fig. 2 is a side elevation of the same;

Fig. 3 is an enlarged transverse sectional view taken along the lines 3—3 and in the direction of the arrows as indicated in Fig. 1;

Fig. 4 is a face view of one of the units of this assemblage; and

Fig. 5 is a view similar to Fig. 4 but showing a slightly different form of construction.

In these views, it will be seen that the reference numeral 5 indicates the propeller or driving shaft extending from the source of power (not shown). This shaft may conveniently mount a pinion 6, the teeth of which mesh with a ring gear 7. The latter is mounted by a shaft 8 and this mechanism may be enclosed within a housing 9. Secured to the shaft 8—or extensions thereof—are ground-contacting and working elements, such as, for example, tines.

The latter have been indicated by the numeral 10. The method of attachment between these and the shaft 8 may include hub portions 11 and securing elements 12. In any event, as shaft 5 is rotated, gear 7 will be turned to rotate shaft 8. This will correspondingly drive the tines or other elements secured to the shaft at points beyond the casing 9.

In similar lay-outs of apparatus, considerable difficulty has heretofore been experienced in that the area of the ground in line with the casing 9 has not been properly contacted and "worked" by the tines or other tools associated with the machine. In order that the parts may be sufficiently rugged and capable of transmitting the required amount of power, the casing 9 must necessarily include a certain width. The greater this width the greater will be the spacing between the inmost tools or tines adjacent opposite sides of the casing. Therefore, the greater will be the untreated area or path traversed by the machine. Attempts have been made to solve this difficulty by employing specially modified tools or angularly spaced tines adjacent the casing and so that the latter might, for example, extend inwardly. At best, such attempted solutions have proven unsatisfactory. Even where the width of the casing has been reduced to a minimum the untilled area or width of the ground strip in line with this casing has required most careful operation of the machine and the reworking of the ground by subsequent traversal thereof along an overlapping pattern. Even with the greatest of care, difficulties have been experienced, particularly where the ground is of a clay or gumbo type or where cement or stabilization work is undertaken.

As will be seen in Fig. 3, a solution of this difficulty in machines of this type is to be found by providing a stub shaft 13 rotatably mounted by the housing 9 and having secured to it a pinion 14, the teeth of which are engaged by the teeth of the ring gear 7. This shaft 13 may be mounted in suitable anti-friction bearings 15 which may incorporate a thrust provision. Secured to the outer end of this shaft in any desirable manner is a tool 16. This may be more or less of the rock drill type. Obviously, the diameter of gear 14 may be apportioned with respect to that of gear 7 so that any desired turning ratio may be embodied. In other words, the shaft 13 may be driven at high or lower speeds according to the proportion of the parts.

In any event, with the apparatus as shown traversing a given path, the tool 16 will serve to engage and work the ground in line with the casing 9. The operation of the tool 16 may be harmonized to the operation of the particular tool elements or tines 10, although this need not necessarily be the case. It is obvious, however, that the ground will be thoroughly worked along the path between the innermost tines or other elements and, accordingly, it will be unnecessary for the operator to exercise great care to guide the machine to provide a suitable overlapped pattern.

It is apparent that any desired tool in lieu of the one indicated at 16 might be employed. For example, as in Fig. 5, a unit including a body having projecting or blade portions 18 may be utilized. Obviously, the diameter of the aggregate blade portions should be just short of the spacing between the elements which are situated adjacent the housing 9 and driven by the shaft 8. The configuration of the blades 18 may be modified so as to provide, in effect, a "weedless" impeller unit to which earth and other material will not tend to adhere.

I am aware that it has heretofore been proposed to work the ridge of soil in the center of the strip of ground traversed by the machine by means of a series of comparatively long spring tools which are mounted to rotate behind the regular tilling tools and in a direction at right angles thereto, but the arrangement is so impractical that, so far as I am aware, it has never been used commercially. Due to the forward motion of the machine these tools are bent backwardly as they hit the ground and increasingly so as they pass through it; those nearer the machine being obviously bent to a greater degree than those further away because the ground resistance encountered by the first tools is greater. Furthermore, the overall length of the machine is substantially increased and, since rotating tilling tools must be covered by a hood to prevent the soil from flying all over, the arrangement heretofore proposed requires either a different and much longer hood than is required for the regular tools, or an auxiliary hood over the rearwardly mounted tools.

By applying the center-strip working tool as disclosed herein, no increase in the overall length of the machine is effected and no changes in the hood are necessary. The center-strip working tool is positioned substantially between the regular tools on either side of the main drive shaft and the whole design is very simple, rigid and compact.

Thus, among others, the several objects of the invention as specifically aforenoted are achieved. Obviously, numerous changes in construction and rearrangement of the parts might be resorted to without departing from the spirit of the invention as defined by the claims.

I claim:

1. In a rotary tilling device, the combination with a gear casing having a driven shaft extending therethrough with a group of tilling tools mounted thereon at each side of said casing, of a separate tilling tool, means rotatively mounting said separate tool on said casing in a position substantially between said groups of tools, and means cooperating with said separate tool for rotating the same about an axis at right angles to the axis of said shaft.

2. In a rotary tilling device, the combination with a gear casing having a driven shaft extending therethrough with a group of tilling tools mounted thereon at each side of said casing and a gear therein mounted on said shaft for driving the same, of a separate tilling tool, means for rotatively mounting said separate tool on said casing in a position substantially between said groups of tools and where it will engage the soil in front of said casing in approximately the same line as the tools of said groups initially contact the soil, and means cooperating with said gear for rotating said separate tool.

3. In a rotary tilling device, the combination with a gear casing having a driven shaft extending therethrough with a group of tilling tools mounted thereon at each side of said casing and a gear therein mounted on said shaft for driving the same, of a separate tilling tool, means rotatively mounting said separate tool on said casing below and in front of said driven shaft, and means cooperating with said gear for rotating said separate tool.

4. The structure set forth in claim 1 in which said separate tilling tool is provided with rigid soil tilling blades.

5. The structure set forth in claim 2 in which said separate tilling tool is provided with rigid soil tilling blades.

6. The structure set forth in claim 3 in which said separate tilling tool is provided with rigid soil tilling blades.

7. In a rotary tilling device, the combination with a gear casing having a driven shaft extending therethrough with a group of tilling tools mounted thereon at each side of said casing and gears therein for driving said shaft, of means for tilling the soil between said groups of tools comprising a drill, means on said casing for rotatively mounting said drill so that it will engage the soil between said groups of tilling tools and in advance of said casing, and means cooperating with one of the gears in said casing for rotating said drill.

CADWALLADER W. KELSEY.